United States Patent
Murphy

(10) Patent No.: US 6,236,326 B1
(45) Date of Patent: May 22, 2001

(54) METHOD AND APPARATUS FOR INTELLIGENTLY SIGNALING A BATTERY CHARGE CONDITION IN A WIRELESS TELEPHONE

(75) Inventor: Paul A. Murphy, Hong Kong (HK)

(73) Assignee: Vtech Telecommunications, Ltd., Hong Kong (HK)

( * ) Notice: Subject to any disclaimer, the term of this patent is extended or adjusted under 35 U.S.C. 154(b) by 0 days.

(21) Appl. No.: 09/430,143

(22) Filed: Oct. 29, 1999

(51) Int. Cl.[7] ................................................ G08B 17/10
(52) U.S. Cl. .................. 340/636; 340/635; 340/539; 340/661; 340/691; 340/825.25; 455/572; 455/425; 455/127; 455/38.2; 455/573
(58) Field of Search ..................................... 340/636, 539, 340/661, 691, 635, 825.25; 455/425, 572, 127, 567, 573, 38.2, 38.4

(56) References Cited

U.S. PATENT DOCUMENTS

| | | | | |
|---|---|---|---|---|
| 5,497,507 | * | 3/1996 | Komaki | 455/89 |
| 5,563,931 | * | 10/1996 | Bishop et al. | 379/59 |
| 5,726,636 | * | 3/1998 | Hayes, Jr. | 340/636 |
| 5,901,361 | * | 5/1999 | Luong | 455/517 |
| 5,974,312 | * | 10/1999 | Hayes, Jr. et al. | 455/419 |

* cited by examiner

Primary Examiner—Jeffery Hofsass
Assistant Examiner—Hung Nguyen
(74) Attorney, Agent, or Firm—Dick And Harris

(57) ABSTRACT

An apparatus and method for intelligent low battery response by a wireless telephone is provided. When the wireless telephone's rechargeable battery nears depletion of energy, and a call is in progress, the party conversing with the wireless telephone user is provided with a voice notification that termination of the call due to battery depletion is imminent. When the wireless telephone's rechargeable battery pack nears depletion of energy and a call is not in progress, the wireless telephone automatically initiates call forwarding with the wireless telephone network such that calls directed to the subscriber's wireless telephone number while the battery is depleted are redirected to a different telephone number. After replacing or recharging a depleted battery pack, and repowering on the wireless telephone, call forwarding is automatically deactivated such that the subscriber can resume receiving calls at the wireless telephone number.

9 Claims, 1 Drawing Sheet

METHOD AND APPARATUS FOR INTELLIGENTLY SIGNALING A BATTERY CHARGE CONDITION IN A WIRELESS TELEPHONE

BACKGROUND OF THE INVENTION

Cellular and wireless telephones have become important and ubiquitous tools of communication in today's society. Cellular and wireless telephones provide a convenient means by which a subscriber to services offered by a cellular or wireless communication services network provider/operator can speak with others by telephone from nearly any place at nearly any time. Additionally, a subscriber can conveniently be contacted by friends, family, or business associates by their dialing the telephone number assigned to the subscriber by the cellular/ wireless network operator no matter where the subscriber may be located within the geographical region served by the operator.

While cellular and wireless telephones (collectively "wireless telephones") have greatly facilitated communications among individuals, certain aspects of their operation continue to limit their effectiveness. One such limiting aspect of wireless telephones is their limited battery life. Because the batteries within the telephone are frequently exhausted, they must either be exchanged for a fresh battery, or recharged. However, of ten times users do not carry a fresh fully charged battery with them due to the inconvenience. Recharging a battery when attached to the phone typically precludes its use during such time and more importantly precludes it from being carried with the subscriber. Furthermore, users sometimes forget or fail to notice that their telephone battery is low and in need of recharging.

Consequently, wireless telephone users often use the telephone until the batteries therein are discharged. When a battery's charge is exhausted the user is of course unable to continue to use the telephone and may be greatly inconvenienced. Due to the nature of the electronics of a typical wireless telephone, the telephone in fact ceases to operate when the charge remaining in the battery drops below a certain level but, nevertheless, is not completely discharged.

If the battery charge is depleted during the course of a telephone conversation, the telephone will cease to operate. The cellular and/or wireless network will detect that the cellular subscriber is no longer "on-line" and will terminate the connection such that the other party to the call perceives being abruptly disconnected. The party with whom the subscriber was speaking accordingly does not know how or why the telephone conversation has been terminated. The other party may be confused or misled as to is why the conversation terminated. That party may mistakenly believe that the subscriber "hung up" on him or her. That party may needlessly worry that the subscriber encountered trouble or was involved in some kind of accident, if for example, the subscriber was speaking from an motor vehicle. That party may further become frustrated upon futilely attempting to contact the subscriber by dialing the subscriber's wireless telephone number while the telephone is without power. Moreover, if the cellular telephone battery becomes discharged while the user is not engaged in a telephone conversation, for example while either powered off or during standby mode, the user may not realize that the battery has ceased to power the phone such that important telephone calls may go unanswered. For example, a user who keeps a wireless telephone in a briefcase or coat pocket would likely not notice when the cellular telephone ceases to function after its battery is depleted.

Accordingly, it is an object of the present invention to automatically provide a voice notification to the party speaking to the cellular subscriber when a wireless telephone battery is depleted of energy during a telephone conversation, thereby informing the other party that the subscriber's wireless telephone has been depleted of power and will be temporarily unavailable. The other party will consequently be informed of the nature of the call interruption, and can take action accordingly.

It is another object of this invention to automatically initiate the forwarding of calls placed to a subscriber's wireless telephone number when a subscriber's telephone battery runs out of energy while a call is not in progress, such that calls directed to the wireless telephone number are automatically redirected to a different number. For example, a subscriber could set his wireless telephone such that calls are forwarded to another predetermined telephone number, such as his office telephone number, when his telephone battery fails. Accordingly, an individual at the subscriber's office, such as a secretary, may then answer calls to the subscriber's telephone number, handle important matters and take appropriate alternative actions to contact the subscriber if necessary.

It is yet another object of this invention to automatically disable call forwarding, such that calls placed to a subscriber's wireless telephone number are actually received at the wireless telephone and not redirected, when the telephone is powered on after replacing or recharging a depleted battery. Therefore, once a subscriber exchanges or recharges the depleted battery and repowers the wireless telephone the subscriber can once again receive calls as the telephone will automatically cancel call forwarding. This feature provides increased convenience to the subscriber, and prevents the subscriber from missing telephone calls if the subscriber were to forget to manually cancel call forwarding.

SUMMARY OF THE INVENTION

This invention consists of a wireless telephone which automatically takes action to reduce the inconvenience of wireless telephone battery depletion immediately prior to the batteries running out of energy. Specifically, if a telephone call is not in progress when a battery nears depletion, the invention contacts the wireless telephone network and initiates call forwarding to a different number. If a telephone call is in progress when a battery nears depletion, the invention plays an audible message to the party with whom the wireless subscriber is speaking, thereby informing the party that the wireless connection will soon be lost.

The invention consists of a wireless telephone. When the wireless telephone detects that its battery is nearly out of energy, the wireless telephone plays a predetermined voice message out to the other party. In one embodiment of the invention, the wireless telephone allows the user to record a personal voice message in memory.

In another embodiment of the invention, the wireless telephone transmits a signal enabling call forwarding to the wireless network just before the wireless telephone battery runs out of energy while a telephone call is not in progress. This invention assures that calls directed to the subscriber's wireless telephone number can be received at a different number while the subscriber's wireless telephone remains unpowered due to battery failure.

The invention may also automatically contact the wireless telephone network and disable the forwarding of telephone calls directed to the subscriber's wireless telephone number when the telephone is re-powered after replacing or recharging a failed battery.

DETAILED DESCRIPTION OF THE INVENTION

Figure 1:
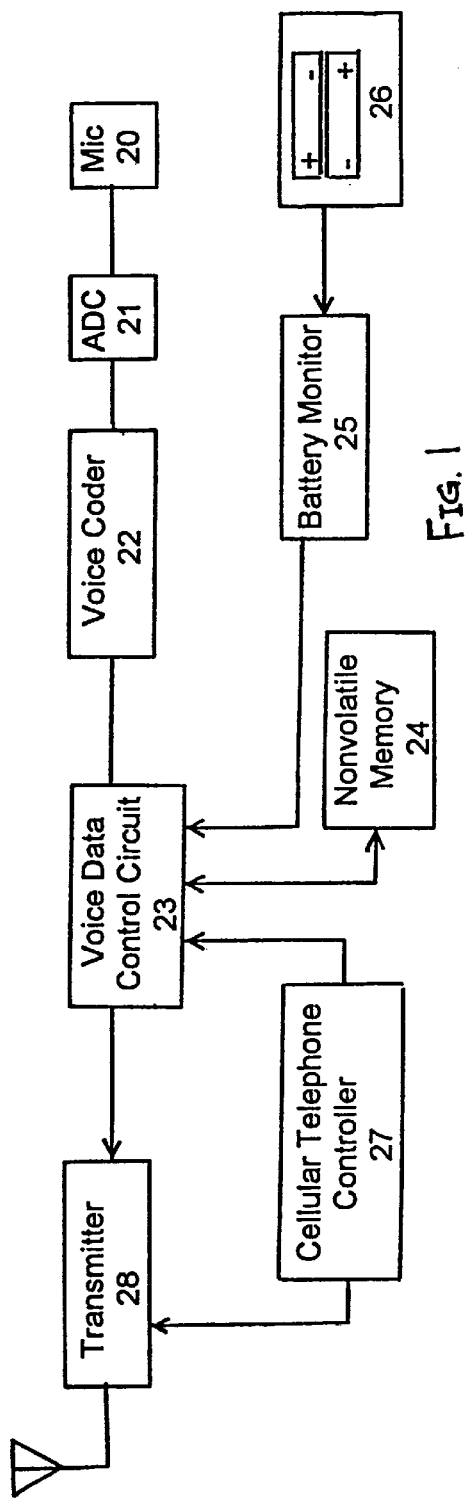
FIG. 1 is a schematic block diagram of one embodiment of the invention, whereby the wireless telephone can record a low battery notification message, and play the notification message when the battery nears depletion.

While this invention is susceptible to embodiment in many different forms, there are shown in the drawings and will be described in detail herein several specific embodiments, with the understanding that the present disclosure is to be considered as an exemplification of the principle of the invention and is not intended to limit the invention to embodiments illustrated.

FIG. 1 of the drawings illustrates an embodiment of the present invention comprising a wireless telephone. In the embodiment illustrated, the telephone sends a previously recorded notification to the other party when the call is in imminent danger of termination due to depletion of the telephone's rechargeable battery pack. The schematic block diagram of FIG. 1 illustrates only the elements of the wireless telephone which are specifically referenced in this invention. In order to clarify the present invention, further detail as to the operation and design of wireless telephones is not included because such detail is well known in the art and not necessary to understand this invention.

During normal wireless telephone call operation, the user's voice is digitized and coded by microphone 20, analog-to-digital converter 21, and voice coder 22. This sequence of components conveys the digital voice data to voice data control circuit 23. In normal operation, control circuit 23 conveys the voice data on to transmitter 28, which formats the voice data along with control data received from wireless telephone controller 27, modulates it, and transmits the signal at RF frequencies according to a wireless radio protocol for which the telephone is designed. The particular digital radio protocol used (e.g. CDMA, TDMA, FHSS, etc.) is unimportant to this invention, as the invention will function similarly for any digital protocol.

Battery monitor circuit 25 monitors the level of energy remaining in rechargeable battery pack 26. When battery monitor circuit 25 detects a predetermined level of energy remaining in battery pack 26, a signal is sent to voice data control circuit 23. Circuits which monitor the energy remaining in a rechargeable battery pack are well known in the art, and their exact configuration and operation will depend heavily on the type of rechargeable battery used in the electronic device. Consequently, the details of this circuit are not important to the present invention and will not be described in detail.

It is desirable that the level of remaining energy at which the battery monitor circuit 25 will send a signal to control circuit 23 is at least equal to the amount of energy required to complete a desired function—in this case, transmit a previously recorded voice notification message. The precise energy level at which battery monitor 25 will generate its signal will depend upon the power consumption characteristics of the wireless telephone with which this invention is implemented, and the discharge characteristics of the rechargeable battery pack used in the design. Furthermore, choice of battery monitor "trigger point" will involve a tradeoff between triggering earlier, at a higher level, to ensure sufficient energy remains in battery pack 26 to complete transmission of the notification message in all conditions, and triggering later, at a lower energy level, to maximize the useful operating time of the wireless telephone.

When voice data control circuit 23 receives a signal from battery monitor 25, control circuit 23 will begin to retrieve the previously recorded voice notification message data out of nonvolatile memory 24, toward being subsequently formatted and transmitted by transmitter 28. The other calling party is thereby notified by 'playback' of the pre-recorded message that the call is about to be terminated due to depletion of the wireless telephone battery pack 26.

In the preferred embodiment of this invention, the notification message is stored in nonvolatile memory 24. It is contemplated, and thus within the scope of the present invention, that the user will be provided with the capability to record his or her own message. To this end, the user may speak into the telephone whereby voice data control circuit 23 can write digital voice data from voice coder 22 representative of the user's voice into nonvolatile memory 24. In one embodiment of this feature, a user might use the standard wireless telephone user interface to initiate the notification message recording mode through software. The wireless telephone controller 27 would cause voice data control circuit 23 to enter a recording mode, in which the user would speak into microphone 20. The user's digitized and coded voice would be taken from voice coder 22 and written into nonvolatile memory 24 by voice data control circuit 23. This recording process could be terminated manually by the user through the user interface, which would cause telephone controller 27 to stop voice data control circuit 23 from writing to nonvolatile memory 24. Alternatively, voice data control circuit 23 may include a threshold detector circuit, which would stop the writing of voice data into nonvolatile memory 24 upon detecting that the amplitude of the digitized voice signal has fallen below a threshold level for a predetermined period of time, thus indicating that the user has finished speaking the notification message.

In the alternative embodiment of the invention, the message played back to the other party to the call may be a standard 'pre-recorded' message programmed into the telephone's memory during manufacture.

Figure 2:
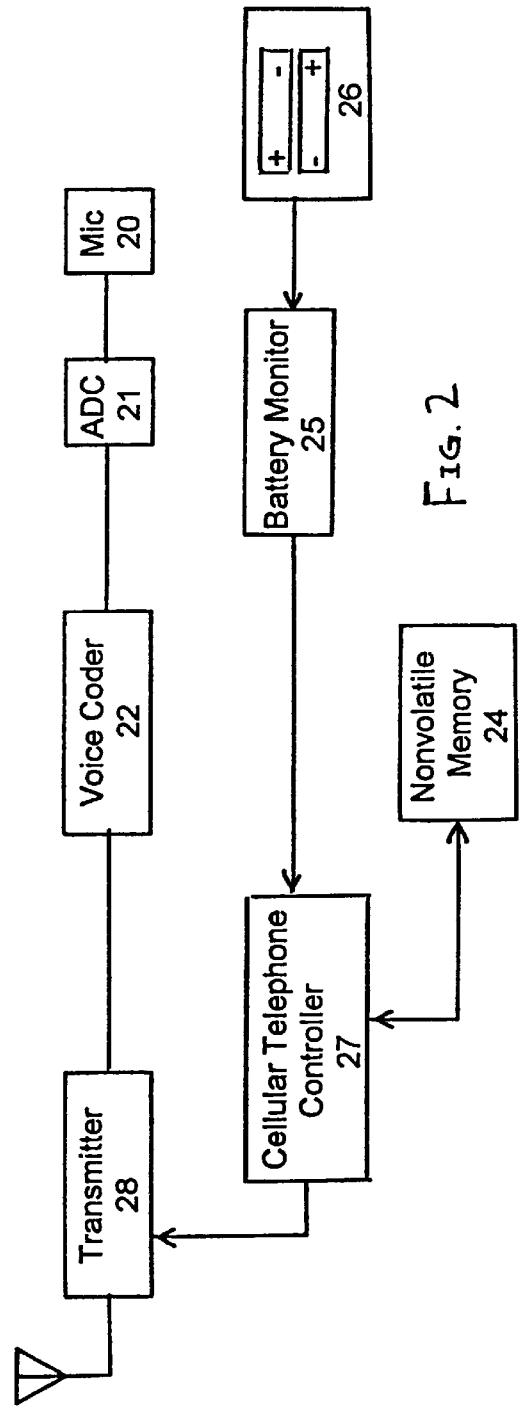
FIG. 2 is a schematic block diagram of another embodiment of the invention, whereby the wireless telephone can enable call forwarding when a battery nears depletion, and can cancel call forwarding when the telephone is powered on following depletion of a battery.

FIG. 2 illustrates another embodiment of the present invention. This invention comprises a wireless telephone which causes telephone calls directed to the telephone number to be redirected to a different telephone number when the telephone's rechargeable battery pack reaches a low energy level such that depletion of the battery pack is imminent and/or the level drops to the point where the telephone may no longer function. The schematic block diagram of FIG. 2 illustrates only the elements of the wireless telephone which are specifically referenced in this invention. Further detail as to the operation and design of wireless telephones is not included in order to clarify the present invention, and because such detail is well known in the art and not necessary the understanding of this invention.

As detailed in the previously discussed embodiment, battery monitor circuit 25 monitors the level of energy remaining in rechargeable battery pack 26. However in embodiment illustrated, when battery monitor circuit 25 detects a predetermined level of energy remaining, a signal is generated and sent to wireless telephone controller 27. It is contemplated that the level of remaining energy at which the battery monitor circuit 25 will send a signal to controller 27 is at least equal to the amount of energy required to complete the desired function—in this case, initiate a cellular or wireless telephone connection to the cellular/wireless telephone network and communicate a forwarding telephone number. As in the previous embodiment, the precise predetermined point at which battery monitor 25 will generate its signal will depend upon a variety of factors, and it is contemplated that the telephone designer or user would configure the telephone appropriately.

Upon receipt by wireless telephone controller 27 of a signal from battery monitor 25 indicating impending depletion of battery 26, controller 27 initiates a connection with the wireless telephone network. Controller 27 then transfers a previously programmed forwarding telephone number to the wireless network, according to the appropriate procedure as specified by the service provider. This procedure typically merely involves the transmission to the network of a required series of DTMF tones with or without pauses. Finally, controller 27 causes the telephone to terminate the connection with the wireless telephone network. Call forwarding is thereby enabled, and any calls placed thereafter to the subscriber's wireless telephone are automatically redirected by the telephone network operation to the forwarding number programmed into the telephone. The operation of wireless telephones, and telephone forwarding services, are well known in the art and therefore will not be described in detail.

According to one embodiment of the invention, call forwarding is terminated when the user powers on the telephone after replacing or recharging the depleted battery pack. When the wireless telephone is powered on, controller 27 detects whether call forwarding was enabled during the previous user due to battery depletion. As implemented in the embodiment of FIG. 2, wireless telephone controller 27 sets a flag in nonvolatile memory 24 following the transfer of the previously programmed forwarding telephone number to the wireless telephone network, and before the battery is depleted, to indicate that call forwarding has been enabled. When the telephone is powered on, controller 27 queries this flag. If the flag indicates that call forwarding has been enabled, controller 27 resets the flag and initiates a connection with the wireless telephone network. Call forwarding is then canceled through the appropriate procedure as specified by the wireless service provider, and the wireless telephone is then disconnected from the network. This procedure mirrors that used to activate call forwarding, and likewise typically consists of transmitting a series of DTMF tones.

The foregoing description and drawings merely explain and illustrate the invention and the invention is not limited thereto except insofar as the appended claims are so limited, inasmuch as those skilled in the art, having the present disclosure before them will be able to make modifications and variations therein without departing from the scope of the invention.

I claim:

1. An apparatus for intelligently signaling a low battery charge condition in a wireless telephone, the apparatus comprising:
   a wireless telephone device engaged in communications with at least one party;
   a battery for supplying electrical power to the wireless telephone;
   a control circuit for transmitting a predetermined message to the at least one party, with whom the wireless telephone device is communicating upon detecting, after engaging in the communications, that the energy level remaining in the battery has reached a level such that the wireless telephone will no longer have sufficient electrical power to operate shortly after having transmitted the predetermined message.

2. A rechargeable battery powered wireless telephone which provides a voice notification to at least a first party engaged in a telephone call with the wireless telephone user when the energy remaining in the battery reaches a specified level, the apparatus comprising:
   a wireless telephone handset engaged in communications;
   a rechargeable battery for providing electrical power to the wireless telephone handset;
   a battery monitor circuit electrically connected to the battery which generates a low battery signal when the energy level remaining in the battery reaches a specified level while the wireless telephone is engaged in communications;
   nonvolatile memory for storing a voice notification message;
   control circuit electrically connected to the battery monitor circuit, which control circuit following detection of a low battery signal from the battery monitor circuit causes the wireless telephone handset to transmit the voice notification message stored in the nonvolatile memory to a party with whom the wireless telephone device is communicating;
   whereby when the battery pack reaches a specified energy level, the wireless telephone sends a voice notification to warn the first party that the telephone call will be terminated due to the depletion of the wireless telephone battery.

3. The wireless telephone of claim 2, further including
   an audio signal digitizer which converts analog audio signals into a coded digital representation of the audio signals; and
   means for recording a notification message by storing the output of the audio signal digitizer into the nonvolatile memory;
   whereby a wireless telephone user can record a personal notification message to warn the first party when a telephone call will be terminated due to the depletion of the wireless telephone battery.

4. A rechargeable battery powered wireless telephone which automatically enables the forwarding of telephone calls directed to the wireless telephone number, such that calls directed to a subscriber's wireless telephone number are redirected to a different telephone number, upon detection of a specified energy level remaining in the rechargeable battery when a wireless telephone call is not in progress and the wireless telephone is in a powered-on state, such an apparatus comprising a wireless telephone including:
   a rechargeable battery which provides electrical power to the wireless telephone handset;
   a battery monitor circuit operatively connected to the battery which generates a low battery signal when the level of energy remaining in the battery falls below a first specified level while the wireless telephone is in a powered-on state;
   a control circuit electrically connected to the battery monitor circuit which upon detection of the low battery signal causes the telephone to enable call forwarding by initiating a connection to the wireless telephone network, communicating to the wireless telephone network a previously programmed forwarding telephone number, and disconnecting from the wireless telephone network;
   whereby thereafter calls directed to the user's wireless telephone number are automatically redirected to a different telephone number.

5. A rechargeable battery powered wireless telephone which automatically enables the forwarding of telephone calls directed to the wireless telephone number, such that calls directed to a subscriber's wireless telephone number are redirected to a different telephone number, upon detection of a specified energy level remaining in the rechargeable battery when a wireless telephone call is not in progress, such an apparatus comprising a wireless telephone including:

a rechargeable battery which provides electrical power to the wireless telephone handset;

a battery monitor circuit operatively connected to the battery which generates a first low battery signal when the level of energy remaining in the battery falls below a first specified level, and generates a second signal when the level of energy remaining in the battery exceeds a second specified level greater than or equal to the first specified level;

a control circuit electrically connected to the battery monitor circuit which upon detection of the first low battery signal causes the telephone to enable call forwarding by initiating a connection to the wireless telephone network, communicating to the wireless telephone network a previously programmed forwarding telephone number, and disconnecting from the wireless telephone network, and which upon detecting the second signal from the battery monitor circuit and after having previously enabled call forwarding due to a low battery condition, initiates a connection to the wireless telephone network and communicates to the wireless telephone network the cancellation of call forwarding such that calls placed to the wireless telephone number are no longer redirected.

6. A rechargeable battery powered wireless telephone which automatically enables the forwarding of telephone calls directed to the wireless telephone number, such that calls directed to a subscriber's wireless telephone number are redirected to a different telephone number, upon detection of a specified energy level remaining in the rechargeable battery when a wireless telephone call is not in progress, such an apparatus comprising a wireless telephone including:

a rechargeable battery which provides electrical power to the wireless telephone handset;

a battery monitor circuit operatively connected to the battery which generates a low battery signal when the level of energy remaining in the battery falls below a first specified level;

control circuit electrically connected to the battery monitor circuit which upon detection of the low battery signal causes the telephone to enable call forwarding by initiating a connection to the wireless telephone network, communicating to the wireless telephone network a previously programmed forwarding telephone number, and disconnecting from the wireless telephone network, and which upon detection that call forwarding has been enabled due to a low battery condition further initiates a connection to the wireless telephone network and communicates to the wireless telephone network the cancellation of call forwarding upon subsequent activation of the wireless telephone.

7. A method of causing a telephone call placed to a subscriber's wireless telephone number while the subscriber's wireless telephone battery has been depleted of energy to be redirected to a telephone number other than that which is assigned to the subscriber's wireless telephone, which method comprises the following:

detecting that the level of energy remaining in the wireless telephone battery has reached or fallen below a specified energy level;

connecting the wireless telephone to the wireless telephone network;

communicating to the wireless telephone network a forwarding telephone number; and disconnecting the wireless telephone from the wireless telephone network;

whereby thereafter calls which are placed to the subscriber's wireless telephone number are automatically redirected to the forwarding telephone number.

8. The method according to claim 7, further including the steps of:

detecting upon power up of the wireless telephone that call forwarding has been enabled due to detection of a low battery energy level during prior use;

connecting the wireless telephone to the wireless network;

communicating to the wireless network the cancellation of call forwarding such that calls placed to the subscriber's wireless telephone number are no longer redirected;

disconnecting the wireless telephone from the wireless network;

whereby calls which are thereafter placed to the subscriber's wireless telephone number are received at the wireless telephone.

9. A method of causing a telephone call placed to a subscriber's wireless telephone number while the subscriber's wireless telephone battery has been depleted of energy to be redirected to a telephone number other than that which is assigned to the subscriber's wireless telephone, which method comprises the following:

detecting that the level of energy remaining in the wireless telephone battery has reached or fallen below a specified energy level;

connecting the wireless telephone to the wireless telephone network;

communicating to the wireless telephone network a forwarding telephone number;

setting a flag in nonvolatile memory after communicating to the wireless telephone network the forwarding telephone number to indicate that call forwarding has been enabled;

disconnecting the wireless telephone from the wireless telephone network;

detecting upon power up of the wireless telephone that call forwarding has been enabled due to detection of a low battery energy level during prior use by checking said flag;

connecting wireless telephone to the wireless network if said flag indicates that call forwarding had been enabled;

communicating to the wireless network the cancellation of call forwarding such that calls placed to the subscriber's wireless telephone number are no longer redirected;

resetting said flag to indicate that call forwarding has been disabled;

disconnecting the wireless telephone from the wireless network;

whereby calls which are thereafter placed to the subscriber's wireless telephone number are received by the wireless telephone.

\* \* \* \* \*